INVENTOR:
Joseph F. Hull
By Ronald W. Reagin
Attorney

INVENTOR:
Joseph F. Hull
By Ronald W. Reagin
Attorney

INVENTOR:
Joseph F. Hull
By Ronald W. Reagin
Attorney

May 28, 1968 J. F. HULL 3,385,994

FORWARD WAVE AMPLIFIER HAVING DISPERSIVE SLOW WAVE STRUCTURE AND MEANS TO VARY THE ELECTRON BEAM VELOCITY

Original Filed Oct. 29, 1963 4 Sheets-Sheet 4

INVENTOR.
Joseph F. Hull
By Ronald W. Reagin
Attorney

United States Patent Office 3,385,994

Patented May 28, 1968

3,385,994

FORWARD WAVE AMPLIFIER HAVING DISPERSIVE SLOW WAVE STRUCTURE AND MEANS TO VARY THE ELECTRON BEAM VELOCITY

Joseph F. Hull, Redwood City, Calif., assignor to Litton Precision Products, Inc., a corporation of Delaware Continuation of application Ser. No. 319,750, Oct. 29, 1963. This application Oct. 13, 1964, Ser. No. 403,589
13 Claims. (Cl. 315—3.5)

ABSTRACT OF THE DISCLOSURE

A forward wave traveling wave tube is disclosed in which the slow wave structure is deliberately made dispersive. The velocity of the electron beam is varied along different longitudinal sections of the interaction region so that in different portions of the interaction region the beam has substantially the same velocity as the phase velocity of different frequency components of an electromagnetic wave which might be traveling on the slow wave structure. By selectively controlling the velocity of the beam in different portions of the interaction region the gain of the tube over its entire operating bandwidth can be controlled.

The present invention relates to electron discharge devices and, more particularly to a broadband forward traveling wave amplifier.

This is a continuation of application Ser. No. 319,750, filed Oct. 29, 1963, entitled, "Electron Tubes With Dispersive Slow Wave Structure," now abandoned.

There is a class of electron discharge devices in which an electromagnetic wave is propagated along a slow wave structure having such characteristics that the phase velocity of the propagated wave is reduced to a value which can be easily obtained by electrons from conventional electron guns. In such devices an electron gun injects an electron beam along the slow wave structure to interact with any wave propagating along the structure. If the propagating wave has a phase velocity substantially equal to the velocity of the electron beam and if other design considerations such as are well known to those skilled in the art are met, the wave interacts with the electron beam and there is a net transfer of energy from the electron beam to the propagating wave, resulting in an amplification of the wave.

It is well known to those skilled in the art that the direction of energy propagation on the slow wave structure, or the direction of the group velocity of a wave on the structure, may be either in the same or opposite direction as the phase velocity of the wave. Since the electron beam must always travel in the direction of the phase velocity of the wave, the direction of the group velocity may be either in the same direction as the velocity of the electron beam or in the opposite direction. Devices so operating are termed forward wave or backward wave devices, respectively. Such devices may be used either as amplifiers or oscillators. Conventionally, such devices have been operated in the forward wave mode of operation when they are used as amplifiers and in the backward wave mode of operation when they are used as oscillators.

One of the primary advantages for using such devices in their forward wave mode of operation when an amplifier is desired is the inherent broadband characteristic of such devices. As will later be described in detail, the slow wave structures for such devices can be designed such that the phase velocity of a propagating wave is substantially uniform over a considerable bandwidth. Thus, a wave of any frequency within this bandwidth may interact with an electron beam of constant velocity and the device will amplify, at least to some extent, any frequency component of a propagating wave within the bandwidth of the structure.

However, as is well known to those skilled in the art, while such devices may interact with and amplify a wave over a substantial bandwidth, the extent of interaction, and accordingly the amplification, is not uniform throughout the interaction bandwidth because of various nonuniform electrical parameters of the slow wave structure. For example, it is known that for a broadband slow wave structure, the impedance of the structure is not uniform throughout the bandwidth, even though the phase velocity may be uniform, and it is also known that the extent of interaction is a function of the impedance. Thus, the gain of the structure exhibits certain known nonuniformities over the bandwidth, which will later be described in detail.

It is accordingly an object of the present invention to provide an improved electron discharge device.

It is another object of the present invention to provide an improved amplifier for a high frequency electromagnetic wave.

It is another object of the present invention to provide an improved broadband electron discharge device.

It is yet another object of the present invention to provide an improved broadband forward wave amplifier.

It is still another object of the present invention to provide an improved forward wave amplifier which has a uniform frequency response throughout its bandwidth.

It is still another object of the present invention to provide an improved forward wave amplifier whose frequency response can be selectively adjusted to any desired shape, even after the device has been constructed.

Briefly stated, and in accordance with one embodiment of the present invention, a forward traveling wave electron discharge device is provided which includes a dispersive slow wave structure. An interaction region is provided adjacent the slow wave structure and means are provided for inserting electrons into the interaction region to interact with a wave propagating on the slow wave structure. Further means are provided for selectively controlling the velocity of the electrons in the interaction region according to a pre-determined velocity program whereby, as will be later shown in detail, a predetermined frequency response can be achieved.

For a complete understanding of the invention, together with other objects and advantages thereof, reference may be had to the accompanying drawings, in which.

In the folowing description of the figures, like reference numerals are used to identify like or corresponding parts in the various drawings whenever practical.

Figure 1:
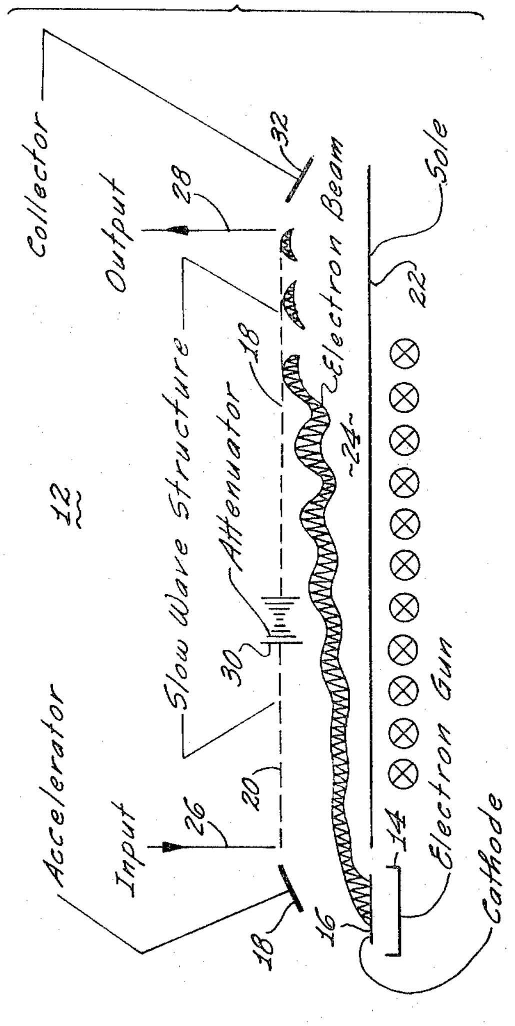
FIGURE 1 shows a schematic representation of a forward wave crossed field amplifier.

FIGURE 1 shows a schematic representation of a forward wave crossed field amplifier. As shown therein the device 12 includes an electron gun section 14 having a cathode 16 and an accelerator electrode 18. The device also includes a slow wave structure 20 and a sole electrode 22 which define therebetween an interaction region 24. Slow wave structure 20 includes suitable input means 26 at its end adjacent electron gun 14 and suitable output means 28 at the remote end of slow wave structure 20. If desired, an attenuator 30 may be provided on the slow wave structure to attenuate undesired reflected waves. A collector electrode 32 at the end of interaction region 24 remote from electron gun 14 completes the structure shown in FIGURE 1.

The operation of forward wave crossed field amplifiers such as those that are shown in FIGURE 1 is well known to those skilled in the art and this operation will be only briefly described herein. Suitable potentials are applied to slow wave structure 20 and sole 22 to provide an electric field having an intensity E at the interaction region. A transverse magnetic field with an intensity B, indicated in FIGURE 1 by the conventional symbol of crosses in a circle, is provided by any suitable means such as a permanent magnet or an electromagnet. A positive voltage relative to cathode 16 is applied to accelerator electrode 14 to accelerate electrons away from cathode 16 and the electrons are injected in the shape of a ribbon beam into interaction region 24. As is well known to those skilled in the art, the electron beam travels down the interaction region 24 with a velocity equal to $E/B$. The dimensions of the slow wave structure and the values of E and B are chosen such that the phase velocity of a desired space harmonic of an input wave is also equal to $E/B$, and, as is well known to those skilled in the art, the electrons in the beam interact with the wave propagating on slow wave structure 20, delivering a portion of their potential energy to the wave, thereby amplifying the wave. Some of the electrons in the beam are collected on slow wave structure 20 and the remaining electrons are collected on collector electrode 32 after leaving the interaction region 24. The amplified output wave is removed from slow wave structure 20 through output 28.

To better understand the operation of the device of FIGURE 1 and the improvements effected by the present invention, consider certain general properties of any type of wave traveling in any type of medium. For a thorough discussion of wave propagation in a medium, see Brillouin, Wave Propagation and Group Velocity, Academic Press, New York, 1960. As described in Chapter I therein, a wave traveling in a medium may be considered to have two velocities, the phase velocity, or the apparent wave front velocity at a point in the medium, and the group velocity, or the velocity at which energy is propagated in the wave. If one plots the frequency $\omega$ of the wave as a function of the phase constant $\beta$, the so-called $\omega$–$\beta$ diagram, then the phase velocity of the wave at any point is $\omega/\beta$ and the group velocity is $d\omega/d\beta$. Brillouin also discusses the concept of dispersion in a medium. A medium may be said to be dispersive if the phase velocity varies with frequency and nondispersive if the phase velocity remains constant with a change in frequency.

Figure 2:
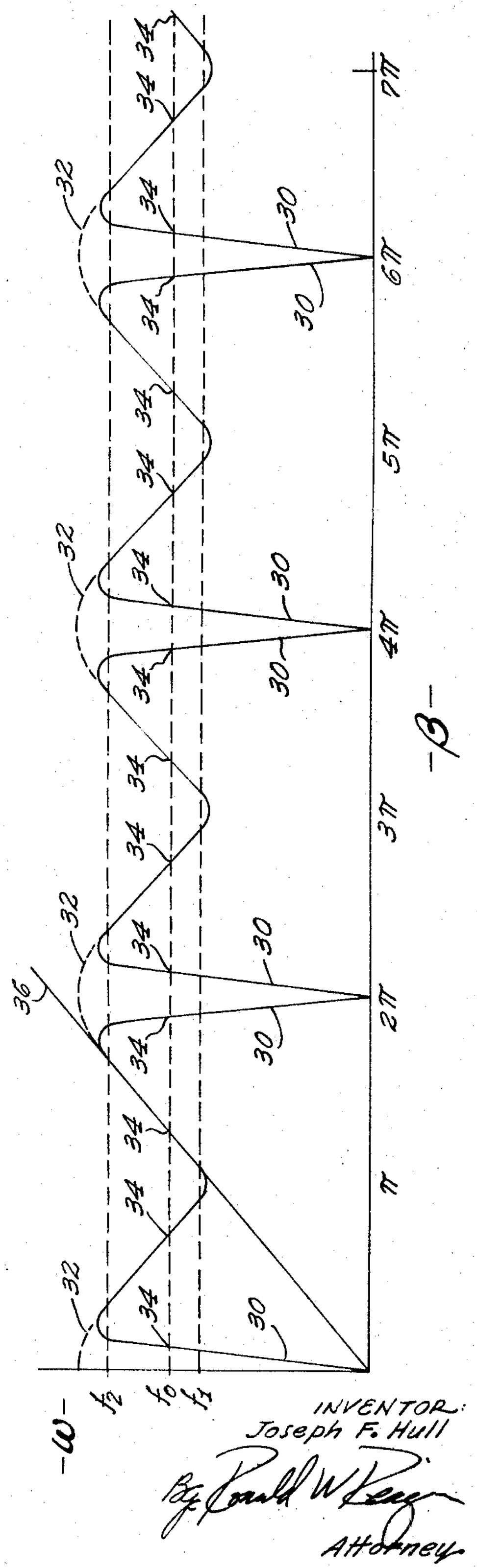
FIGURE 2 shows the relationship between the frequency and the phase shift of a periodically loaded transmission line such as the slow wave structure of the device of FIGURE 1.

Next consider FIGURE 2 which graphically shows the relation between the frequency $\omega$ in radians/second and the phase constant $\beta$ or phase shift per section in radians for a slow wave structure such as that in the device of FIGURE 1. As shown in FIGURE 2, the $\omega$–$\beta$ diagrams for a conventional crossed field traveling wave tube is an endless series of identical curves. The "skirts" 30 on the curves are caused by the presence of the sole electrode near the slow wave structure. If the sole electrode were not present, the curves in the diagram would be connected as shown by the dashed lines 32. The curve would then resemble the conventional sinusoidal-like curve for any periodically loaded waveguide. For a general discussion of the propagation of an electromagnetic wave in a periodically loaded waveguide such as a slow wave structure, see Appendix I of the book by Reich et al., Microwave Principles, Van Nostrand, Princeton, N.J., 1967.

Consider next any frequency $f_0$ within the operating bandwith of the curve of FIGURE 2. It is observed that $f_0$ intersects the $\omega$–$\beta$ diagram at an infinite number of points 34. As is described in Reich et al. above, each of these points 34 may be considered to be a space harmonic component of the wave of frequency $f_0$, with each space harmonic component having a frequency $f_0$ but having differing phase and group velocities. From the above discussed definition in Brillouin the phase velocity at any given point in the $\omega$–$\beta$ diagram is $\omega/\beta$, which is the slope of a line drawn from the point to the origin and the group velocity is $d\omega/d\beta$ which is the slope of the $\omega$–$\beta$ diagram at the particular point. Thus, FIGURE 2 shows that, ignoring the points 34 on the skirts 30, a wave having a frequency $f_0$ may be considered to be an infinite number of space harmonics having alternately forward and backward group velocities of the same magnitude and progressively smaller phase velocities in the same direction.

As is also discussed in Reich et al. above, any electron having a velocity equal to the phase velocity of any space harmonic component of a wave propagating on a slow wave structure may interact with the wave. Thus, it is seen that there is theoretically an infinite number of velocities that an electron may have to interact with a given wave propagating on a slow wave structure and that the electron can interact with waves traveling in the same direction as the electron, a so-called forward wave, or in the opposite direction of the electron motion, a so-called backward wave.

One of the desirable characteristics of forward traveling wave tubes in general has been their broad frequency response, or broadbandedness. Such devices have conventionally been designed so that there is as wide a frequency bandwidth as possible in which the phase velocity of a wave propagating on the slow wave structure is substantially constant so that a space harmonic component of any wave in the bandwidth can interact with an electron beam traveling in the interaction region with this constant velocity.

Still referring to FIGURE 2, there is shown a line 36 drawn through the origin which substantially intersects the $\omega$–$\beta$ diagram between the frequencies $f_1$ and $f_2$. It is observed that throughout this intersection both the phase velocity $\omega/\beta$ and the group velocity $d\omega/d\beta$ are equal to the slope of line 36 and are substantially constant between $f_1$ and $f_2$. Thus, by the earlier definition from Brillouin, the slow wave structure may be said to be nondispersive between $f_1$ and $f_2$. A forward traveling wave device exhibiting such characteristics can amplify any applied wave between the frequencies $f_1$ and $f_2$ if the electron beam velocity in the device corresponds to the slope of line 36, since any such frequency input wave has a space harmonic whose phase velocity is also equal to the slope of line 36.

Even though such a device can amplify any input signal between $f_1$ and $f_2$, it is known to those skilled in the art that the amount of amplification is not constant over the bandwidth. There are several electrical reasons for this, the primary one being that the impedance of the slow wave structure is not constant over the operating bandwidth and that the amount of interaction, and thus of amplification, is a function of the impedance.

Figure 3:
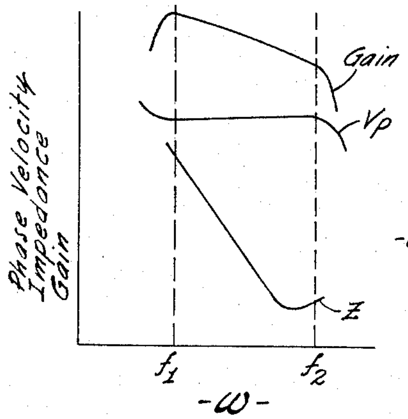
FIGURES 3 through 6 show the graphical relationship between various parameters of a device such as is shown in FIGURE 1.

Referring now to FIGURE 3, therein is graphically shown the relationship between the phase velocity, the impedance and the gain of a conventional traveling wave tube such as has been described above as a function of the frequency of the device. It is observed from FIGURE 3 that the impedance Z decreases steadily for frequencies above $f_1$, reaching a valley prior to $f_2$, and again increases thereafter. Without going into quantitative measures, this may be understood from a brief examination of FIGURE 2. At each peak and valley in the $\omega$–$\beta$ diagram, $d\omega/d\beta$ is zero and the group velocity is also zero. At these points no energy propagates in the slow wave structure and the impedance is obviously infinite. Referring now again to FIGURE 3, it is obvious that for some frequency slightly less than $f_1$ and at another frequency slightly higher than $f_2$ the impedance Z is infinite and at some point between these frequencies a valley or point of minimum impedance is reached.

Thus, even though the phase velocity $V_P$ is constant between $f_1$ and $f_2$ as is also shown in FIGURE 3, the gain is not constant because at the lower frequencies in the range there is a higher impedance and a resultant greater interaction. This results in the gain curve shown in FIGURE 3 which has its peak near $f_1$ and which gradually diminishes to $f_2$. In a traveling wave tube the difference in gain $f_1$ and $f_2$ may typically be three decibels, which is to say a two-to-one change in power level. There is one compensating factor without which the difference in gain at the two frequencies would be even greater. For the higher frequencies with their shorter wave lengths, a given physical length of slow wave structure is a greater number of electrical wavelengths long. The higher frequency waves thereby interact with the electron beam for a longer period of time than do the lower frequency waves. However, even this does not compensate completely for the difference in impedance across the frequency bandwith.

The curve showing the relationship between the gain and frequency of the device is used several times hereinafter. This curve illustrates what is known to those skilled in the art as the frequency response of the device, and such curves will be so referred to hereafter.

All of the above described considerations relating to nondispersive slow wave structures, changes in impedance, and the resultant nonuniform frequency response are well known to those skilled in the art. However, until the present invention, it has been a basic axiom to all tube designers that if broadband operation is desired a non-dispersive slow wave structure must be used. For example, the classic text on the subject of traveling wave tube design is Pierce, Traveling Wave Tubes, Van Nostrand, Princeton, New Jersey, 1950. In Chapter 5 thereof, Pierce discusses the design requirement for slow wave structures and repeatedly stresses that for broadband operation phase velocity must remain constant with frequency, which is to say the slow wave structure must be nondispersive.

Figure 4:
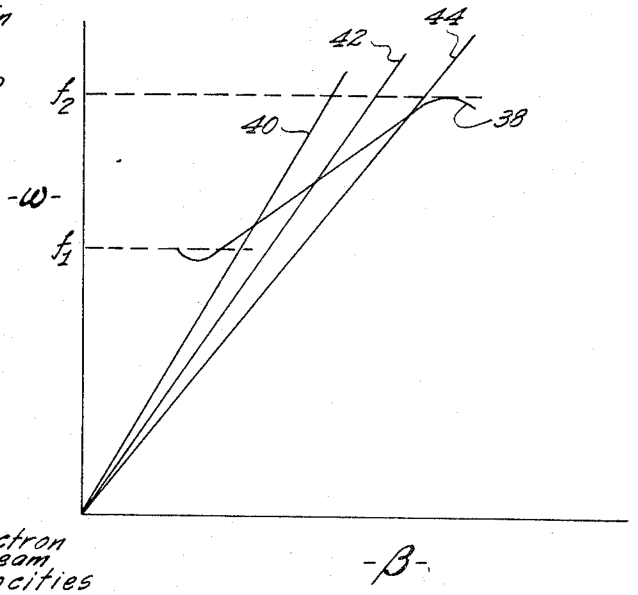

FIGURE 4 graphically shows certain features of a dispersive slow wave structure and illustrates principles which may be useful in understanding the present invention. In FIGURE 4 curve 38 represents the $\omega-\beta$ diagram of a dispersive slow wave structure. For simplicity, only that portion of the $\omega-\beta$ diagram lying in the operating region of the selected space harmonic is illustrated. Lines 40, 42 and 44, each of which passes through the origin and intersects curve 38 at a respective selected point between lower cut-off frequency $f_1$ and upper cut-off frequency $f_2$, represent three different electron beam velocities. Line 40, which has the steepest slope and therefore reprsents the highest electron velocity, intersects curve 38 at some frequency slightly above $f_1$. Line 42 intersects curve 38 substantially at the middle frequency between $f_1$ and $f_2$ and line 44 intersects curve 38 at some frequency less than $f_2$. If a device were constructed having a dispersive slow wave structure whose characteristics were similar to that represented by curve 38 and if an electron beam were provided having a velocity corresponding to any one of the lines 40, 42, or 44, then the beam would interact only with those frequencies whose phase velocity is near the selected velocity of the elecron beam and the resultant device would have a relatively narrow bandwith.

Figure 5:
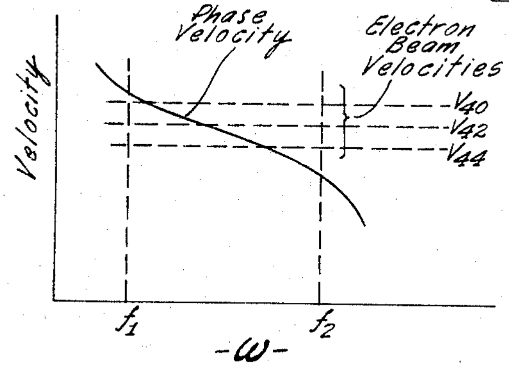

FIGURE 5 graphically shows the phase velocity of a device corresponding to FIGURE 4 as a function of the operating frequency of the device and illustrates that the phase velocity progressively decreases throughout the operating bandwith between $f_1$ and $f_2$. The velocity lines $V_{40}$, $V_{42}$ and $V_{44}$ respectively correspond to the electron beam velocities corresponding to lines 40, 42 and 44 of FIGURE 4.

Figure 6:
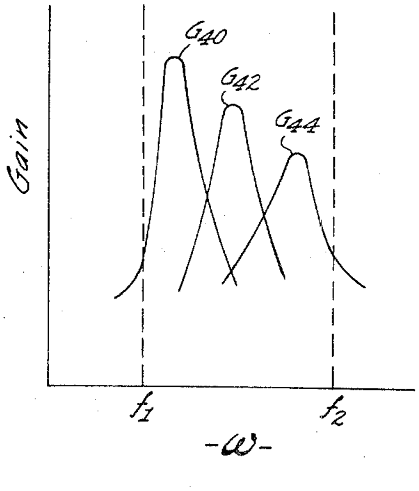

FIGURE 6 graphically shows the frequency response of a device corresponding to FIGURE 4 if, as was discussed above, the device were operated with electron beam velocities corresponding to lines 40, 42 or 44. The curve $G_{40}$ shows the frequency response of the device if the electron beam velocity corresponds to line 40. The curve $G_{42}$ shows the frequency response if the electron beam corresponds to line 42 and the curve $G_{44}$ shows the frequency response if the electron beam velocity corresponds to line 44. It is observed that in each of the three cases the bandwidth is relatively narrow and that the peak gain progressively decreases for the higher frequency operation, because of the previous described decrease in impedance at higher frequencies.

Figures 7, 9:
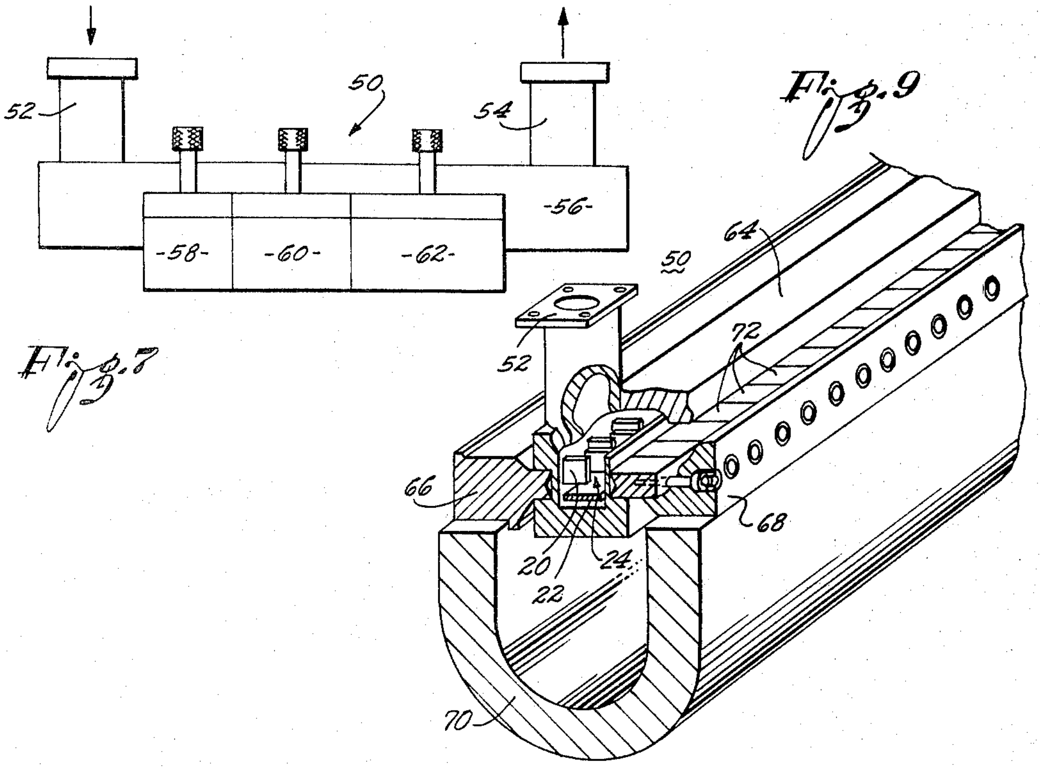
FIGURE 7 shows a schematic representation of one embodiment of the present invention.
FIGURES 9 and 10 show details of the construction of the device of FIGURE 7.

FIGURE 7 shows a forward wave crossed field amplifier similar to that shown in FIGURE 1 but modified in accordance with the present invention to achieve a uniform frequency response throughout the operating bandwidth of the device. In FIGURE 7 the device 50 includes an input structure 52 and an output structure 54. A dispersive slow wave structure 56 having characteristics similar to those shown in FIGURE 4, is provided within device 50, and thus no details of it are shown in the external view of FIGURE 7. The device also includes three sections 58, 60 and 62 in which the electron beam velocity is varied, with the velocity corresponding to line 40 of FIGURE 4 in section 58, corresponding to line 42 in section 60, and corresponding to line 44 in section 62. Specific structure for providing the varying electron beam velocity is later described in connection with FIGURES 9 through 14.

Figure 8:
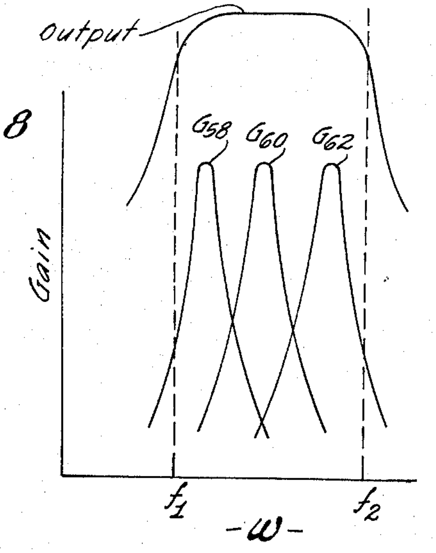
FIGURE 8 shows the frequency response of the device of FIGURE 7.

FIGURE 8 shows the frequency response of the device of FIGURE 7. The curve $G_{58}$ shows the frequency response in section 58 of device 50, the curve $G_{60}$ shows the frequency response in section 60, and the curve $G_{62}$ shows the frequency response in section 62. It is observed that the peak gains of the three frequency response curves of FIGURE 8 are equal, as compared with the unequal peak gains of the curves of FIGURE 6. This increase in peak gain in the higher frequency region is achieved by making the sections 60 and 62 progressively longer, as is illustrated in FIGURE 7, to provide an increased interaction length for the higher frequency components of an input signal to device 50 to compensate for the lower slow wave structure impedance at these higher frequencies. As is illustrated in FIGURE 8, the output frequency response of device 50, which is the sum of the curves $G_{58}$, $G_{60}$ and $G_{62}$, is substantially uniform throughout the operating bandwidth of the device.

In the above example of the invention, the interaction region of device 50 is in effect divided into three regions in each of which a different electron beam velocity is provided to effect the uniform frequency response of the device. Three sections were chosen for purposes of illustration only. It is obvious to those who are skilled in the art that any desired number of sections can be chosen to effect the uniform frequency response. Also, by choosing various numbers of sections and by varying the relative length of the sections, any desired frequency response may be obtained. Thus, while one ordinarily desires a uniform frequency response throughout the operating bandwidth, if for some reason a selected nonuniform frequency response is desired, the number and length of the sections may be chosen to effect any desired predetermined frequency response.

Those skilled in the art can appreciate that the present invention combines two modifications of conventional forward wave amplifiers, either of which in itself would adversely affect the operation of the device, to obtain a vastly improved performance characteristic of the device. These modifications are to provide a dispersive slow wave structure and to program or vary the electron velocity in the interaction region in a predetermined manner. By itself the dispersive slow wave structure would greatly decrease the bandwidth, as was described above and is described in Pierce above, and by itself the provision of the varying electron beam velocity when used with a conventional nondispersive slow wave structure would greatly decrease the gain of the conventional device since the phase velocity of the propagating wave and the velocity of the electron beam would be synchronous during only a limited part of the interaction region. However, when these features are combined in accordance with the present invention, one may achieve essentially absolute uniformity in frequency response throughout the bandwidth of the device, or any other frequency response desired across the bandwidth.

FIGURES 9 through 14 shows specific embodiments of forward traveling wave amplifiers which embody the present invention.

Figure 10:
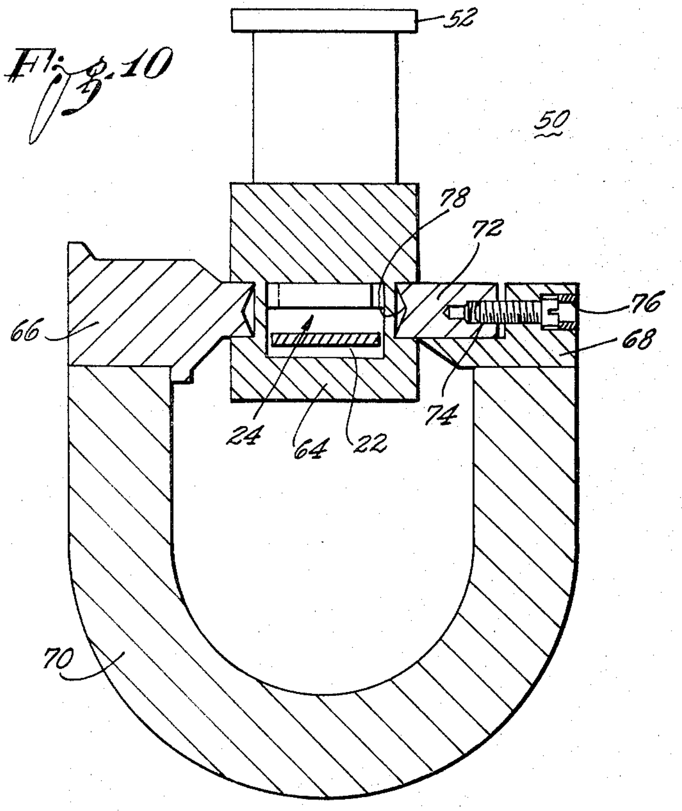

FIGURES 9 and 10, respectively, show a perspective view, partly in cross section, and a cross sectional end view of a forward wave crossed field amplifier using the preferred embodiment of the present invention. The device 50 includes the dispersive slow wave structure 20, the sole electrode 22, the interaction region 24 and the input means 52. The sectional views of FIGURES 9 and 10 are taken between the electron gun and the input so that the electron gun does not show in these figures.

The dispersive slow wave structure 20 and sole electrode 22 are positioned in a conductive evacuated envelope 64 which is supported along its length by pole pieces 66 and 68 on opposite sides of the interaction region 24. The poles of a horseshoe-shaped permanent magnet 70 connect to the pole pieces 66 and 68 to provide the transverse magnetic field in interaction region 24. As was previously mentioned and as is well known to those skilled in the art, the velocity of an electron in the interaction region of a crossed field device is equal to $E/B$ where E and B, respectivly, represent the values of the transverse electric and magnetic fields. In the preferred embodiment of the present invention the desired electron beam velocity programming is effected by varying the ratio $E/B$ in a desired manner. Specifically, it has been found best to vary the value of the magnetic field B, decreasing B where higher electron velocity is desired and increasing B where a lower electron velocity is desired.

To provide the adjustable magnetic field, pole piece 68 includes a plurality of segments 72 which are slidably mounted for lateral movement to adjust the spacing between pole pieces 66 and 68 along the length of interaction region 24. This slidable mounting may be achieved by drilling and tapping segment 72 and by providing a corresponding countersunk hole in pole piece 68 for each segment 72. A screw 74 is placed in each hole in pole piece 68 and threaded into the tapped hole in segment 72. Bushing 76 retains screw 76 in the hole, and by turning screw 74 its corresponding segment 72 may be moved nearer to or further from the opposite portion of pole piece 66 as desired. By moving the face 78 of segment 72 closer to pole piece 66, a stronger magnetic field intensity in the immediately adjacent interaction region may be provided; conversely, by moving face 78 away from the opposite portion of pole piece 66 a weaker magnetic field intensity may be provided.

In a typical embodiment of the invention about twenty-five slidable segments 72 may be provided. Thus the magnetic field intensity in the interaction region, and accordingly the electron velocity, may be adjusted into practically an infinite combination of values to provide practically any desired frequency response for the device, at least within the limits of the device.

The arrangement of FIGURES 9 and 10 also illustrates another feature of the invention. The adjustment of the magnetic field intensity, and thus the electron velocity, can be made externally after the device is completely constructed. Thus, by external adjustment during actual operation of the device, the desired frequency response can be obtained to a degree of accuracy limited only by the quality of the test instruments used to measure the frequency response.

Figure 11:
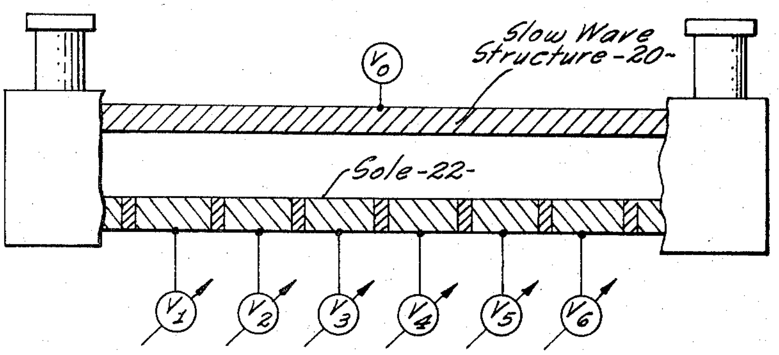
FIGURES 11 through 14 show schematic representation of additional embodiments of the present invention.
Figure 12:
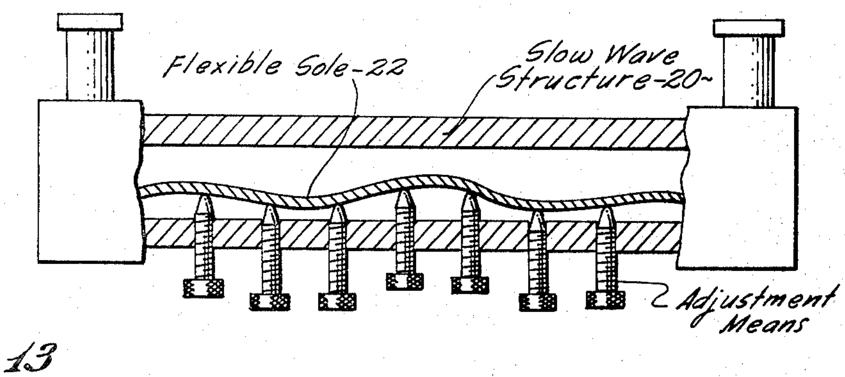
Figure 13:
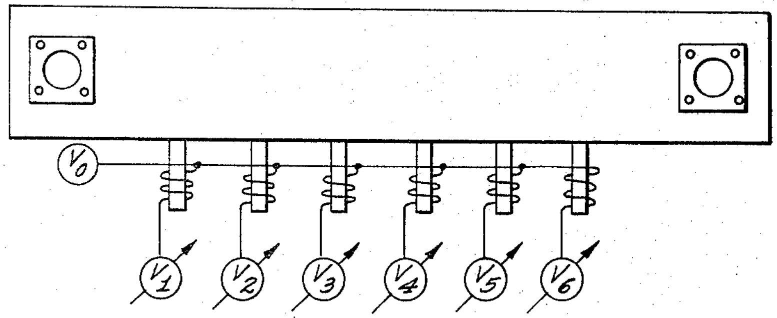
Figure 14:
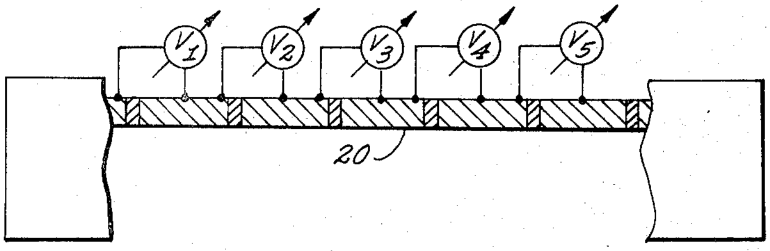

FIGURES 11 through 14 show additional embodiments of the invention in which the ratio $E/B$ may be adjusted along the interaction region of a forward wave crossed field amplifier. In FIGURE 11 the sole 22 is divided into a plurality of electrically insulated segments and a separate voltage source is connected to each segment to provide a varying electrical field intensity, and thus a varying $E/B$ ratio in the interaction region. In FIGURE 12 is a flexible sole 22 is provided which may be maintained at a constant potential to thereby provide the controllable electrical field intensity in the interaction region. In FIGURE 13 the pole piece segments are replaced with a corresponding plurality of electromagnets each of which is energized from a separate controllable voltage source to thereby provide the programmed magnetic field intensity in the interaction region. In FIGURE 14 the slow wave structure 20 is divided into a plurality of electrically insulated segments each of which is maintained at a chosen electric potential by a controllable voltage source.

In all of the above described embodiments of the invention, the velocity of the electron beam is selectively varied to effect a desired frequency response. The structure of the invention may also be used to vary the total phase shift through the device, if this is desired instead. This can be done because the $\beta$, of phase "constant," is not strictly constant in slow wave structures such as are used in traveling wave tubes, but is instead slightly variable with electron beam velocity. This is because of the coupling between the beam and the propagating wave. If the velocity of the beam in reduced, it tends to retard the wave, thereby increasing $\beta$; conversely, if the velocity of the beam is increased, it tends to drag the wave forward, thereby decreasing $\beta$. Since the total phase shift through the device is the sum of the products of the length of the incremental sections and the particular $\beta$ in each respective section, the total phase shift through the device can be controlled by controlling the number and the length of the incremental sections and by controlling the electron beam velocity and thus the $\beta$, in each section. The number and length of the sections and the electron beam velocity can be varied in the manner described above.

In all of the embodiments described above the invention has been used in a crossed field or M-type device. The invention may also be used in a so-called O-type device if suitable means are provided to vary the electron velocity along the interaction region adjacent a dispersive slow wave structure. One kind of O-type traveling wave tube which could readily be adapted for use with the present invention is an electrostatically focused traveling wave tube; for example, if an Einzel lens arrangement is used to maintain the electron beam in focus varying voltages could be applied to the lenses instead of the usual alternate positive and negative voltages to provide the necessary beam velocity programming in combination with the dispersive slow wave structure.

It is to be understood that the above described arrangements are only illustrative of the application of the present invention. Numerous other applications may be devised by those skilled in the art without departing from the spirit and scope of the invention. Thus, by way of example and not of limitation, the invention could also be used in a distributed emission or emissive sole crossed field amplifier as well as the injected beam variety such as is illustrated above. Accordingly, it is understood that the present invention is limited only by the spirit and scope of the appended claims.

What is claimed is:

1. A forward traveling wave electron discharge device comprising, in combination, a dispersive slow wave structure, input means for coupling electromagnetic energy to said slow wave structure and output means for coupling electromagnetic energy from said slow wave structure, an interaction region adjacent said dispersive slow wave structure, means for inserting electrons into said interaction region at a predetermined velocity level for interaction with an electromagnetic wave traveling on said slow wave structure, and means for selectively changing to different velocity levels the velocity of said electrons in successive longitudinal sections of said interaction region, whereby the combination of said dispersive slow wave structure and the changing electron velocities achieve a preselected gain vs. frequency characteristics for said electron discharge device.

2. In a forward wave traveling wave electron discharge device, the combination comprising:

a dispersive slow wave structure; input means for coupling electromagnetic energy to said slow wave structure and output means for coupling electromagnetic energy from said slow wave structure;

means for directing an electron beam along said dispersive slow wave structure; and control means for changing the electron beam velocity to different levels at different positions along the length of said slow wave structure to affect interaction by said electron beam with different frequency components of an electromagnetic wave traveling on said slow wave dispersive structure at different points along said slow wave structure.

3. The combination of claim 2 in which said means for varying the electron beam are adjustable.

4. The combination as described in claim 3 wherein said adjustable means vary the electron beam velocity in different sections along the length of the slow wave structure to provide a predetermined frequency response from said device.

5. In a forward wave traveling wave electron discharge device, the combination comprising:

a slow wave structure designed to have a dispersive phase velocity versus frequency characteristic; input means for coupling electromagnetic energy to said slow wave structure and output means for coupling electromagnetic energy from said slow wave structure;

means for directing an electron beam along said slow wave structure;

means for applying transverse electric and magnetic fields to the beam path; and adjustable means for changing the electron beam velocity to different levels in different sections disposed along the length of said slow wave structure comprising means for varying the ratio of the transverse electric field strength to the transverse magnetic field strength, whereby said electron beam interacts with different frequency components of an electromagnetic wave traveling on said slow wave structure in said different sections.

6. In a forward wave traveling wave electron discharge device, in combination comprising:

a slow wave structure designed to have a dispersive phase velocity versus frequency characteristic; input means for coupling electromagnetic energy to said slow wave structure and output means for coupling electromagnetic energy from said slow wave structure;

means for directing an electron beam along said slow wave structure;

means for dividing said slow wave structure into electrically insulated segments; and means for selectively applying adjustable electric potentials to said segments to controllably change the velocity of said electron beam to different levels at different positions along the length of said slow wave structure, whereby said electron beam selectively interacts with different frequency components of an electromagnetic wave traveling along the length of said slow wave structure.

7. In a forward wave crossed field amplifier, the combination comprising:

a slow wave structure designed to have a deliberate dispersive phase velocity versus frequency characteristic; input means for coupling electromagnetic energy to said slow wave structure and output means for coupling amplified electromagnetic energy from said slow wave structure;

means for directing an electron beam along said slow wave structure;

means for applying transverse electric and magnetic fields to said electron beam; and individually adjustable means for varying the electron beam velocity in different sections along the length of said slow wave structure, including magnetic pole face segments with adjustable spacing and means for adjusting said pole face spacing, whereby said electron beam adjustably interacts with different frequency components of an electromagnetic wave traveling along said slow wave structure in said different sections thereby to provide an adjustable gain vs. frequency characteristic for said amplifier.

8. In a crossed field forward wave amplifier, the combination comprising:

a dispersive slow wave structure, said slow wave structure designed to have a deliberate dispersive phase velocity versus frequency characteristic, input means for coupling electro-magnetic energy to said slow wave structure and output means for coupling amplified electromagnetic energy from said slow wave structure, a sole electrode generally parallel to said slow wave structure, an interaction region bounded by said slow wave structure and said sole electrode, means for establishing an electric field between said sole and said slow wave structure;

means for injecting an electron beam into said interaction region, means for establishing a magnetic field traverse to said electron beam and said electric field, and individually adjustable means for varying the magnetic field strength in different sections along the length of said slow wave structure so as to vary the electron beam velocity as the beam passes through the section, whereby said electron beam adjustably interacts with different frequency components of an electromagnetic wave traveling along said slow wave structure in said different sections thereby to provide an adjustable gain vs. frequency characteristic for said amplifier.

9. The combination of claim 8 in which said means for establishing a magnetic field comprises magnetic pole faces for applying a magnetic field transverse to said electron beam and said electric field in said interaction region and permanent magnetic means for generating a magnetic field between said pole faces and in which said individually adjustable means for varying the magnetic field strength comprises individually adjustable means for varying the spacing between said pole faces along the length of said slow wave structure so as to cause a variation in the magnetic field structure in said interaction region.

10. The combination of claim 8 in which said means for establishing a magnetic field comprises at least one electromagnet.

11. In a crossed field forward wave amplifier, the combination comprising:

a dispersive slow wave structure, input means for coupling electromagnetic energy to said slow wave structure and output means for coupling amplified electromagnetic energy from said slow wave structure, a sole electrode generally parallel to said slow wave structure and defining therewith an interaction region, means for applying an electric potential between said sole electrode and said slow wave structure, means for directing an electron beam into said interaction region, magnetic pole faces for establishing a transverse magnetic field in said interaction region, means for generating a magnetic field between said pole faces, and individually adjustable means for changing the sole electrode-to-slow wave structure to different spacings at different positions along the length of said slow wave structure so as to cause a variation in the electric field intensity in said interaction region, thereby varying the velocity of the electron beam as it passes through the interaction region, whereby said electron means interacts with different frequency components of an electromagnetic wave traveling along said dispersive slow wave structure in different locations along the length of said slow wave structure.

12. The amplifier as claimed in claim 11, wherein the adjustable means for varying the sole electrode-to-slow wave structure spacing includes a flexible sole electrode with individual adjustment means disposed along the length of said sole electrode.

13. In a crossed field forward wave amplifier, the combination comprising:

a dispersive slow wave structure, input means for coupling electromagnetic energy to said slow wave structure and output means for coupling electromagnetic energy from said slow wave structure, a sole electrode generally parallel to said slow wave structure and defining therewith an interaction region, means for applying an electric potential between said sole electrode and said slow wave structure, means for directing an electron beam into said interaction region, magnetic pole faces for establishing a transverse magnetic field in said interaction region, means for generating a magnetic field between said pole faces;

said sole electrode being divided along its length into segments electrically insulated from each other; and adjustable control means for individually varying to different levels the potential of at least some of said sole segments relative to the others thereof along the length of said interaction region to cause a variation in the electric field intensity in said interaction region, thereby varying the velocity of the electron beam as it passes through the interaction region, whereby said electron means interacts with different frequency components of an electromagnetic wave traveling along said dispersive slow wave structure in different locations along the length of said slow wave structure.

References Cited

UNITED STATES PATENTS

| | | | |
|---|---|---|---|
| 2,888,597 | 5/1959 | Dohler et al. | 315—39.3 X |
| 2,995,675 | 8/1961 | Warnecke et al. | 315—3.5 |
| 3,027,487 | 3/1962 | Dench | 315—39.3 |
| 2,804,511 | 8/1957 | Kompfner | 330—43 |

ELI LIEBERMAN, *Primary Examiner.*

HERMAN KARL SAALBACH, PAUL L. GENSLER, *Examiners.*